No. 715,697. Patented Dec. 9, 1902.
J. E. RUEBSAM.
DIAPHRAGM METER AND EXERCISER.
(Application filed Feb. 17, 1900. Renewed May 7, 1902.)
(No Model.) 2 Sheets—Sheet I.
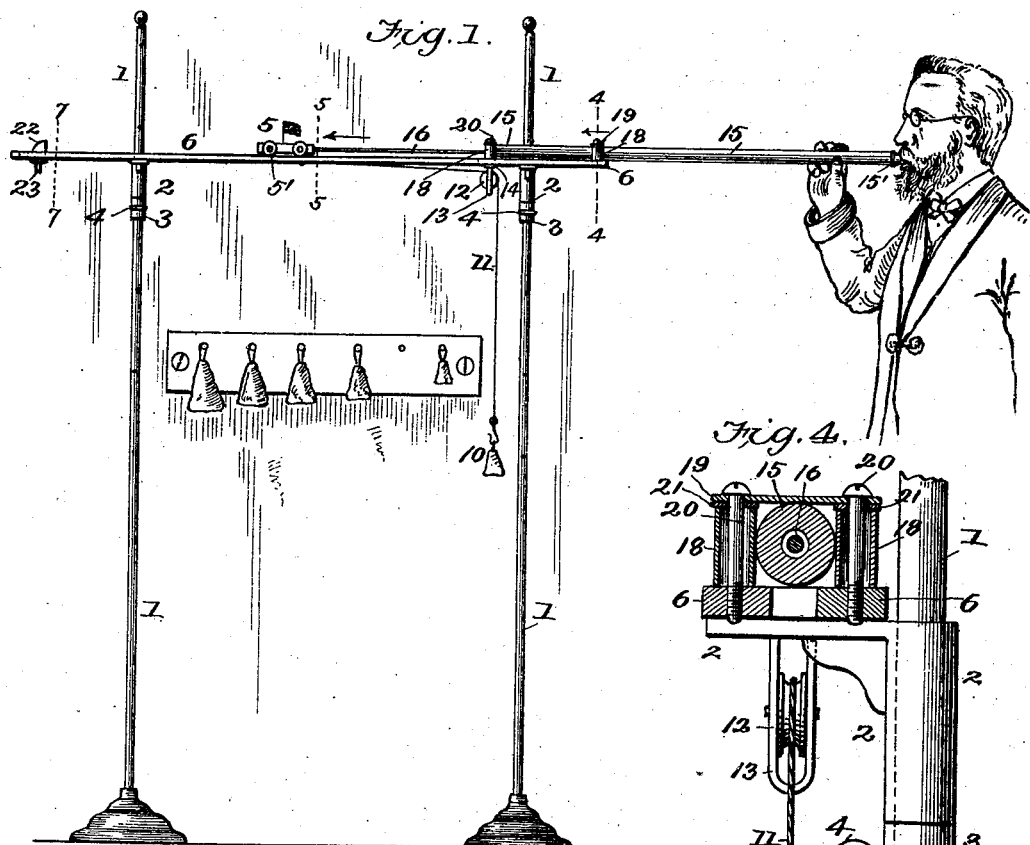
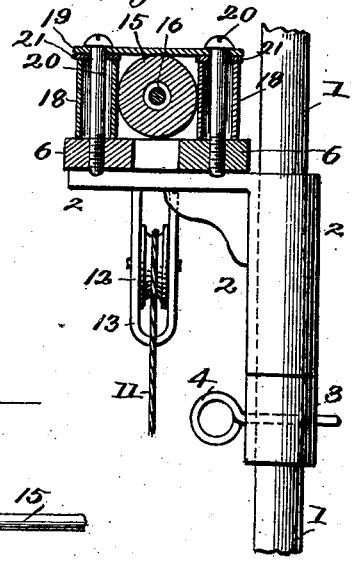
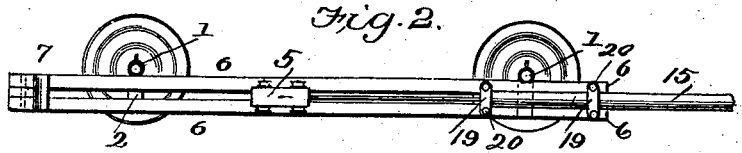
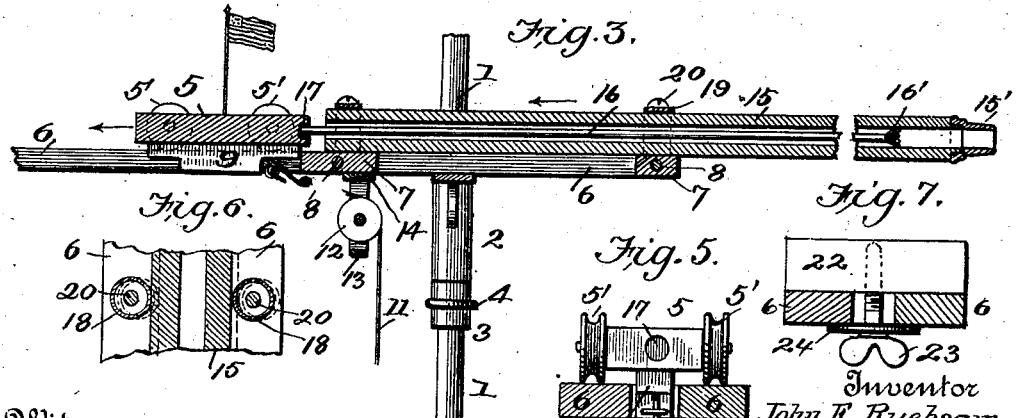
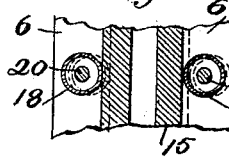
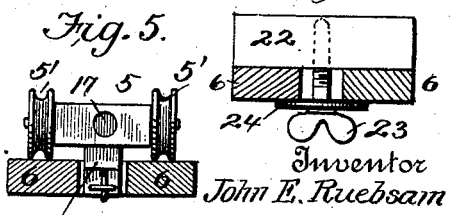
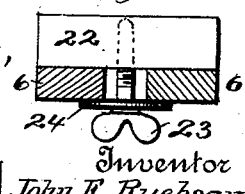
Witnesses
Jos. A. Ryan
Amos H. Hart
Inventor
John E. Ruebsam
By Munn & Co.
Attorneys
THE NORRIS PETERS CO., PHOTO-LITHO., WASHINGTON, D. C.

No. 715,697. Patented Dec. 9, 1902.
J. E. RUEBSAM.
DIAPHRAGM METER AND EXERCISER.
(Application filed Feb. 17, 1900. Renewed May 7, 1902.)
(No Model.) 2 Sheets—Sheet 2.
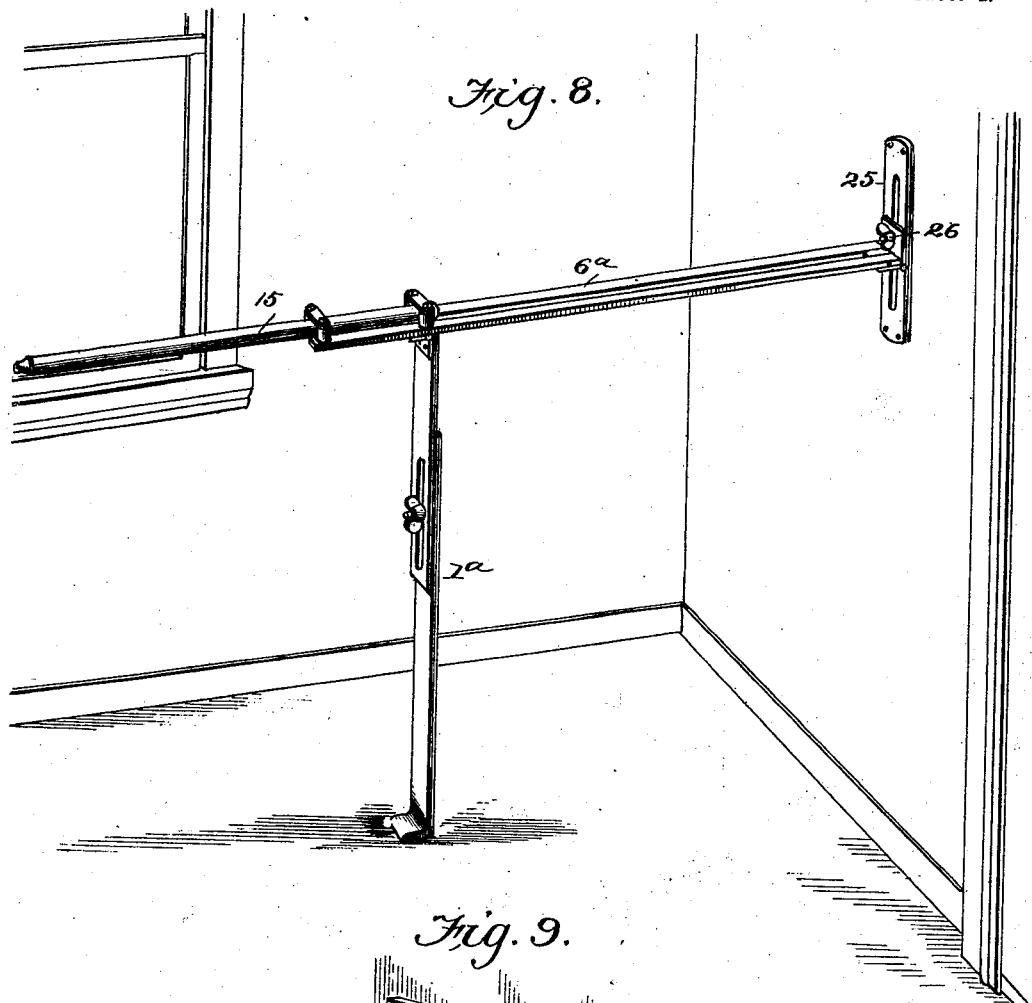
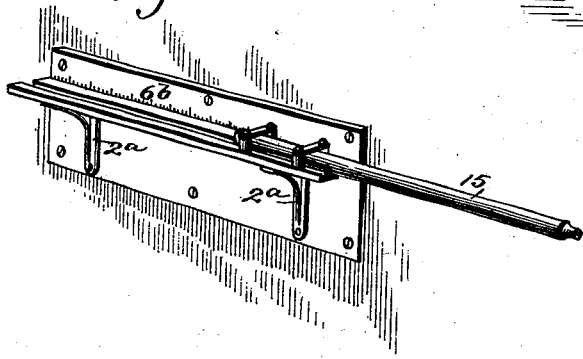
Witnesses
Jas. A. Ryan
Amos W. Hark
Inventor
John E. Ruebsam
By Munn & Co.
Attorneys

UNITED STATES PATENT OFFICE.

JOHN E. RUEBSAM, OF WASHINGTON, DISTRICT OF COLUMBIA.

DIAPHRAGM METER AND EXERCISER.

SPECIFICATION forming part of Letters Patent No. 715,697, dated December 9, 1902.

Application filed February 17, 1900. Renewed May 7, 1902. Serial No. 106,341. (No model.)

*To all whom it may concern:*

Be it known that I, JOHN E. RUEBSAM, residing at Washington, in the District of Columbia, have made certain new and useful Improvements in Diaphragm Meters and Exercisers, of which the following is a specification.

Respiration depends chiefly upon the action of the diaphragm, or the muscular organ intervening the thorax and abdomen. Inspiration takes place in consequence of the enlargement of the thoracic cavity, and the air enters through the respiratory passages in volume corresponding to such increased capacity.
The diaphragm descends into the abdominal cavity and compresses all the abdominal organs while the lungs are inhaling, and in expiration it mounts into the thoracic cavity in the form of a conical arch. The lungs are alternately expanded and contracted according to the extent and force of such vertical movements of the diaphragm. Inflation of the lungs and protrusion of the abdomen, as well as their succeeding contractions, are thus synchronous. Contraction of the diaphragm is auxiliary to the action of the muscular walls of the esophagus, by which the cardiac opening of the stomach is regularly closed during inspiration. These and other allied facts in relation to the diaphragm attest the importance of its strength and proper action. In the case of the great majority of persons the lungs are usually inflated to but one-third their capacity, and the stomach and abdominal organs are also agitated but slightly during respiration. The results are that the blood is not duly oxygenated, digestion and assimilation are imperfect, congestions of the lungs or abdominal organs are not duly relieved, and the tone of the nervous system is lowered, so that vulnerability to disorders or diseases of various kinds is greatly increased as compared with a normal standard. With these results may be included distortion of the normal outline of the chest and the figure as a whole and undue stiffness of the exterior body-muscles surrounding the region of the diaphragm and the hips.

It is the object of my invention to provide a simple but efficient apparatus for testing the strength of the diaphragm and also for use therapeutically in exercising it, to the end that the results above stated may be avoided or overcome. The apparatus is so constructed that the force of expiration acts to propel a small carriage or other movable device resting upon a horizontal and vertically adjustable support, the said carriage or device being weighted to any degree required to give the desired gage or test of the strength of the diaphragm of the person using the apparatus. The operation—*i. e.*, the resistance—of the apparatus is uniform under any degree of air-pressure.

The details of construction and operation are as follows:

In the accompanying drawings, Figure 1 is a side view showing my improved apparatus in use. Fig. 2 is a plan view. Fig. 3 is a central longitudinal section. Fig. 4 is a vertical transverse section on the line 4 4 of Fig. 1. Fig. 5 is a vertical transverse section on the line 5 5 of Fig. 1. Fig. 6 is a detail horizontal section illustrating the means for lateral adjustment of the blow-tube. Fig. 7 is a transverse section on line 7 7 of Fig. 1. Figs. 8 and 9 are perspective views showing modifications.

The apparatus proper is supported upon two vertical standards 1 by means of brackets 2, which are adapted to slide vertically on said standards. The tubular portion 2' of said bracket rests upon sleeves 3, which are secured at any desired height by means of pins 4, as shown best in Fig. 4. By this means the apparatus as a whole may be adjusted higher or lower, corresponding to the height of the person using it. A carriage or other movable device 5 runs upon two parallel rails 6, which rest directly upon the aforesaid brackets 2 and are spaced apart by means of blocks 7, which are secured by pins 8. The said carriage is provided with wheels 5' and also with a central pendent rib 9, which lies between the aforesaid rails 6 and serves as a guide in the movements of the carriage to and fro. A weight 10 (see Fig. 1) is attached to a cord 11, which connects detachably with the said carriage and passes intermediately over a pulley 12, (see Figs. 3 and 4,) which is journaled in a pendent support 13, attached to a bar 14, forming a permanent attachment of the rails 6. A blow-tube 15 is rigidly attached to the rails 6, the same lying upon the upper side of the same and at one end thereof, as shown. This tube is provided with a suitable mouthpiece 15' and is adapted for use of a small rod 16, having a piston 16' at one end and engaging the carriage 5 at the other. The carriage is for this purpose constructed with a cavity 17, (see Figs. 3 and 5,) adapted to receive the end of the rod. The piston 16' may be constructed of any filamentous material, such as is commonly used on darts of blow-guns.

It is apparent that upon the person who is using the apparatus blowing into the tube 15 when the parts are in the position shown in Fig. 3 the push-rod or plunger 16 will be projected according to the force of the expiration or air-pressure applied and that the carriage 5 will be pushed forward on the rails 6 to a corresponding degree. It is further apparent that the distance to which the carriage is pushed forward will depend largely upon the size of the weight suspended from the cord 11. It is proposed to use a series of graduated weights ranging from one-eighth or one-fourth ounce upward. Such weights may be conveniently suspended upon an adjacent side wall, as indicated in Fig. 1. Graduations in feet and inches and fractions of the latter may be inscribed on the rails 6 to furnish a convenient means for ascertaining the strength of the diaphragm of a patient on any particular occasion, and especially for determining his progress from day to day in the muscular development of the organ and in consequent lung capacity. It will be noted that whatever weight is employed its traction upon the carriage, or, in other words, the resistance offered by the latter to the expulsive effort of the patient, will be the same at any point in the movement of the said carriage.

The means for attaching the blow-tube 15 to the rails 6 are as follows: The tube rests directly upon the two interposed blocks 7 at the right-hand end of the rails and between two sets of tubular guides 18, to which a clamping-bar 19 is secured by means of screws 20. The said bar 19 extends across and rests upon two guides 18, and the screws 20 pass through its ends and also through the guides and into the bar 6, as shown best in Fig. 4. Washers 21 are interposed between the bars 19 and guides 18 for the purpose of providing for vertical adjustment of said bar, as may be required when blow-tubes of different sizes are employed, also to compensate for shrinkage of the same, should such occur. In order to provide for lateral adjustment of the tube 15, and thereby securing its due alinement with the carriage and in relation to the slot between the rails, the said guides 18 are adapted to be shifted laterally on the rails 6, as indicated by dotted lines in Fig. 6.

A stop 22, Figs. 1, 2, 7, is provided for the carriage 5, and the same is adapted for adjustment along the rails 6 by means of a clamp-screw 23. The latter passes up through a washer 24 and between the rails 6 into the stop 22, from which arrangement it is apparent said stop may be adjusted and secured at any desired point. When the rails 6 are supported at a good height, as in Fig. 1, the stop 22 may be placed at the end of the same; but in case the rails 6 are lowered to accommodate a short person the weight-cord 11 must be shortened, and the stop 22 should then be placed farther to the right, correspondingly, so that the weight 10 may be prevented coming in contact with the pulley 12 when the carriage 5 is forced along far enough to raise the weight so high.

In Fig. 8 I show rails 6ª hinged to the wall, so that they may be folded or allowed to drop downward and lie against said wall, and thus be out of the way, while ready for convenient use. The blow-tube 15 may in this case be removed or slid up in the clamps to prevent it striking the floor.

A supporting leg or standard 1ª is hinged to the rails 6ª at a point near their free outer end, and the same is composed of two slotted parts adapted to slide upon each other and secured in any rigid adjustment by means of a clamp-screw. The rails 6ª may also be adjustably secured to the wall by means of a vertically-slotted plate 25 and a clamp-screw 26, that passes through one of the leaves of the hinge, as shown. By the provision of these means for adjustment of the rails 6ª they may be kept horizontal at any height.

In Fig 9 the rails 6ᵇ are shown secured horizontally on brackets 2ª, fixed to a board screwed to a wall, which will in some cases be a practical and desirable arrangement.

Having thus described my invention, what I claim, and desire to secure by Letters Patent, is—

1. The improved apparatus for the purpose specified, comprising a suitable support, a device adapted to move thereon and having a weight connected therewith which is adapted to be raised when the device moves forward, a blow-tube arranged at one end of such support, and a plunger or push-rod adapted to work in said tube and to act upon the device in the manner described.

2. The improved apparatus comprising a horizontal support, a carriage adapted to travel thereon, a weight connected with said carriage and adapted to be raised as the carriage advances, a blow-tube secured upon one end of said support, a plunger, or push rod, adapted to work in said tube and for contact with the carriage, and means for guiding the latter in a straight line, substantially as shown and described.

3. The improved apparatus comprising a horizontal support, means for vertically adjusting the same, a carriage adapted to travel on the support and guided thereby, a cord attached to said carriage and a fixed pulley attached to the under side of the support, a weight connected with said cord, and a blow-tube and plunger, substantially as shown and described.

4. In an apparatus for the purpose specified, the horizontal support, having a lengthwise slot, a device adapted to slide on said support and provided with a pendent guide adapted to work in the slot, and a blow-tube and plunger arranged substantially as shown and described.

5. In an apparatus for the purpose specified, the combination with a suitable support, and a device adapted to move thereon, of a blow-tube and a plunger arranged in line therewith and means for securing it to the support, the same consisting of clamps arranged substantially as shown and described.

6. In an apparatus for the purpose specified, the combination with a carriage and a support therefor, of a blow-tube arranged upon the upper side of such support in line with the carriage, a plunger adapted to slide in said tube, and means for clamping and adjusting the tube, consisting of cross-bars, screws passing through the same, and tubular guides adapted for lateral adjustment, substantially as shown and described.

7. The improved diaphragm-meter, composed of a support adapted to be arranged horizontally, a carriage or movable device which is guided on said support, a weight and cord connected with said device, the cord running over a pulley as specified, and a blow-tube and plunger arranged in line with said device, and the plunger being adapted for engagement with the latter, substantially as shown and described.

8. In a diaphragm-meter, the combination with a suitable horizontal support, and a carriage adapted to travel thereon and provided with a socket in one end of the same, of a blow-tube attached to said support, and a plunger adapted to work in the tube and to enter the socket in the carriage, as shown and described.

9. The combination of the rails or slotted frame, a blow-tube secured to one end of the same upon their upper side and parallel thereto, a carriage, and a plunger adapted to slide in said tube so as to be projected in line with the carriage, as shown and described.

10. The combination with a carriage-supporting frame, of a blow-tube which is secured to one end of the same and extended therefrom in a parallel plane, a carriage, and a plunger adapted to slide in said tube so as to be projected in line with the carriage, substantially as shown and described.

11. The combination, with a carriage and the supporting-frame whereon it moves, of a blow-tube arranged in a plane parallel to said frame and in line with the carriage, a plunger which is slidable in the tube, and means which clamp the tube and are adapted to be shifted to permit lateral adjustment of the tube, substantially as shown and described.

12. The combination, with the horizontal support, and a carriage, a blow-tube and a plunger arranged as shown, of an adjustable clamp for the tube, the same comprising a clamping-bar proper, vertical screws securing the same, and shiftable cylindrical guides arranged on said screws, on opposite sides of the tube, as shown and described.

13. The combination with the rails, of a blow-tube secured thereto, a carriage adapted to ride on said rails and in line with the blow-tube, a suspended weight connected with the carriage, and exerting a constant pull on the latter, and a stop adapted for adjustment along said rails, as shown and described.

JOHN E. RUEBSAM.

Witnesses:
AMOS W. HART,
SOLON C. KEMON.